(12) United States Patent
Clark et al.

(10) Patent No.: US 6,168,440 B1
(45) Date of Patent: *Jan. 2, 2001

(54) MULTIPLE TEST ITEM SCORING SYSTEM AND METHOD

(75) Inventors: Jay V. Clark, West Liberty; William L. Bramlett, Jr., Swisher; Judith Moyer, Iowa City, all of IA (US)

(73) Assignee: National Computer Systems, Inc., Eden Prairie, MN (US)

(*) Notice: Under 35 U.S.C. 154(b), the term of this patent shall be extended for 0 days.

This patent is subject to a terminal disclaimer.

(21) Appl. No.: 09/141,804

(22) Filed: Aug. 28, 1998

Related U.S. Application Data

(63) Continuation of application No. 09/003,979, filed on Jan. 7, 1998, which is a continuation of application No. 08/561,081, filed on Nov. 20, 1995, now Pat. No. 5,735,694, which is a continuation of application No. 08/290,014, filed on Aug. 12, 1994, now Pat. No. 5,558,521, which is a division of application No. 08/014,176, filed on Feb. 5, 1993, now Pat. No. 5,437,554.

(51) Int. Cl.[7] ............................................. G09B 7/00
(52) U.S. Cl. ...................... 434/322; 434/118; 434/362; 273/273; 382/321
(58) Field of Search .......................... 434/118, 156, 434/157, 168, 185, 307 R, 308, 322, 323, 350, 362, 365; 382/164, 191, 284, 317, 318, 321; 273/273, 428–432

(56) References Cited

U.S. PATENT DOCUMENTS

| Re. 34,476 | 12/1993 | Norwood . |
|---|---|---|
| 3,405,457 | 10/1968 | Bitzer . |
| 3,538,626 | 11/1970 | Frank . |
| 3,762,072 | 10/1973 | From . |
| 3,932,948 | 1/1976 | Goddard et al. . |
| 4,004,354 | 1/1977 | Yamauchi . |
| 4,151,659 | 5/1979 | Lien et al. . |
| 4,205,780 | 6/1980 | Burns et al. . |
| 4,478,584 | 10/1984 | Kaney . |
| 4,518,267 | 5/1985 | Hepp . |
| 4,518,361 | 5/1985 | Conway . |
| 4,553,261 | 11/1985 | Froessl . |
| 4,648,062 | 3/1987 | Johnson et al. . |
| 4,671,772 | 6/1987 | Slade et al. . |
| 4,694,352 | 9/1987 | Ina et al. . |
| 4,705,479 | 11/1987 | Maron . |

(List continued on next page.)

FOREIGN PATENT DOCUMENTS

| 0 171 663 | 2/1986 | (EP) . |
|---|---|---|
| 4-147288 | 5/1992 | (JP) . |
| WO 90/05970 | 5/1990 | (WO) . |

OTHER PUBLICATIONS

""Score Image" Processing of Constructed–Responses, Essays, and Writing Samples", *Uniscore, Incorporated* (1992).
"Image Processing of Open–Ended Questions", *Uniscore, Incorporated:* (1992).
Brown, P. et al., "Validation—Cost Effective External Evaluation", *Australian Journal of Educational Technology*, 6(2): 5 pages (1990).

(List continued on next page.)

*Primary Examiner*—Joe H. Cheng
(74) *Attorney, Agent, or Firm*—Merchant & Gould P.C.

(57) ABSTRACT

A method and system for increasing the speed at which test answers are processed. The method and system receives electronic representations of test answers and organizes the test answers into separate groupings. Next a particular grouping of test answers are displayed to a test resolver so that the resolver can score the test answers. In displaying the answers, the method and system uses a matrix of cells and displays one test answer in each of the cells. The test resolver can thus simultaneously view multiple test answers, which facilitates efficient scoring of the answers.

20 Claims, 14 Drawing Sheets

U.S. PATENT DOCUMENTS

| | | |
|---|---|---|
| 4,741,047 | 4/1988 | Sharpe, II . |
| 4,760,246 | 7/1988 | Shepard . |
| 4,764,120 | 8/1988 | Griffin et al. . |
| 4,789,543 | 12/1988 | Linder . |
| 4,798,543 | 1/1989 | Spiece . |
| 4,845,739 | 7/1989 | Katz . |
| 4,867,685 | 9/1989 | Brush et al. . |
| 4,878,175 | 10/1989 | Norden-Paul et al. . |
| 4,895,518 | 1/1990 | Arnold et al. . |
| 4,908,759 | 3/1990 | Alexander, Jr. et al. . |
| 4,930,077 | 5/1990 | Fan . |
| 4,937,439 | 6/1990 | Wanninger et al. . |
| 4,958,284 | 9/1990 | Bishop et al. . |
| 4,978,305 | 12/1990 | Kraft . |
| 4,996,642 | 2/1991 | Hey . |
| 5,002,491 | 3/1991 | Abrahamson et al. . |
| 5,003,613 | 3/1991 | Lovelady et al. . |
| 5,011,413 | 4/1991 | Ferris et al. . |
| 5,023,435 | 6/1991 | Deniger . |
| 5,035,625 | 7/1991 | Munson et al. . |
| 5,038,392 | 8/1991 | Morris et al. . |
| 5,059,127 | 10/1991 | Lewis et al. . |
| 5,072,383 | 12/1991 | Brimm et al. . |
| 5,100,329 | 3/1992 | Deesen et al. . |
| 5,101,447 | 3/1992 | Sokoloff et al. . |
| 5,103,490 | 4/1992 | McMillin . |
| 5,105,354 | 4/1992 | Nishimura . |
| 5,119,433 | 6/1992 | Will . |
| 5,134,669 | 7/1992 | Keogh et al. . |
| 5,140,650 | 8/1992 | Casey et al. . |
| 5,147,205 | 9/1992 | Gross et al. . |
| 5,151,948 | 9/1992 | Lyke et al. . |
| 5,176,520 | 1/1993 | Hamilton . |
| 5,180,309 | 1/1993 | Egnor . |
| 5,195,033 | 3/1993 | Samph et al. . |
| 5,204,813 | 4/1993 | Samph et al. . |
| 5,258,855 | 11/1993 | Lech et al. . |
| 5,259,766 | 11/1993 | Sack et al. . |
| 5,261,823 | 11/1993 | Kurokawa . |
| 5,267,865 | 12/1993 | Lee et al. . |
| 5,294,229 | 3/1994 | Hartzell et al. . |
| 5,302,132 | 4/1994 | Corder . |
| 5,321,611 | 6/1994 | Clark et al. . |
| 5,344,132 | 9/1994 | LeBrun et al. . |
| 5,387,104 | 2/1995 | Corder . |
| 5,418,865 | 5/1995 | Bloomberg . |
| 5,433,615 | 7/1995 | Clark . |
| 5,437,554 | 8/1995 | Clark et al. . |
| 5,458,493 | 10/1995 | Clark et al. . |
| 5,466,159 | 11/1995 | Clark et al. . |
| 5,496,175 | 3/1996 | Oyama et al. . |
| 5,558,521 | 9/1996 | Clark et al. . |
| 5,565,316 | 10/1996 | Kershaw et al. . |
| 5,596,698 | 1/1997 | Morgan . |
| 5,634,101 | 5/1997 | Blau . |
| 5,672,060 | 9/1997 | Poor . |
| 5,690,497 | 11/1997 | Clark et al. . |
| 5,709,551 | 1/1998 | Clark et al. . |
| 5,716,213 | 2/1998 | Clark et al. . |
| 5,718,591 | 2/1998 | Clark et al. . |
| 5,735,694 | 4/1998 | Clark et al. . |
| 5,752,836 | 5/1998 | Clark et al. . |

OTHER PUBLICATIONS

Draper, S.W. et al., "Integrative evaluation: An emerging role for classroom studies of CAL", Internet: http://www.psy.gla.ac.uk/~steve/IE.html: 17 pages (Aug. 12, 1995).

Draper, S.W., "Observing, Measuring, or Evaluating Courseware", Internet: http://www.psy.gla.ac.uk/~steve/Eval.HE.html: 10 pages (Feb. 18, 1996).

Foxon, M., "Evaluation of training and development programs: A review of the literature", *Australian Journal of Educational Technology*, 5(2): 16 pages (1989).

Gathy, P. et al.. "Computer—Assisted Self—Assessment (CASA) In Histology", *Computers & Education*, 17(2): Front cover and 109–116 (1991).

IBM "Education Local Area Network and Tools (EdLAN), Tools for education," 16 pages (1991).

Sims, R., "Futures for Computer–Based Training: Developing the learner—computer interface", *Australian Journal of Educational Technology*, 4(2): 11 pages (1988).

MULTIPLE TEST ITEM SCORING SYSTEM AND METHOD

This is a continuation of application Ser. No., 09/003,979, filed on Jan. 7, 1998, which is a continuation of application Ser. No. 08/561,081, filed Nov. 20, 1995, which is now U.S. Pat. No. 5,735,694, which is a continuation of application Ser. No., 08/290,014, which is now U.S. Pat. No. 5,558,521 filed Aug. 12, 1994, which is a division of application Ser. No., 08/014,176, now U.S. Pat. 5,437,554, filed Feb. 5, 1993. U.S. Pat. No. 5,735,694, U.S. Pat. No. 5,735,694, and U.S. Pat. 5,437,554 are hereby incorporated by reference in their entirety.

FIELD OF THE INVENTION

The present invention relates to a system for processing answers to test questions.

BACKGROUND OF THE INVENTION

The scoring of test answer sheets involves complex problems. These test answer sheets typically include a series of response positions such as, for example, "bubbles," ovals, or rectangles. A person taking a test would, for example, darken in an appropriate oval with a pencil to answer a multiple choice question. These test answer sheets may also include handwritten answers, such as essay or short answer questions. Systems for scanning and scoring the bubbles on such answer sheets are known in the art. Increased difficulties are encountered, however, when such answer sheets either include other types of answers, such as handwritten answers, or cannot be machine graded. For example, if the student has failed to include his or her name on the test answer sheet, the system may be unable to machine score the test answer.

The goals in scoring test answers that cannot be machine scored include efficiency and consistency. These test answer sheets are typically scored by test resolvers either by manually scoring the physical test answer sheet or scoring an electronic representation of the test answer sheet on a computer. Ideally, the scores provided by the various test resolvers for a particular test question should be consistent, since the scores are used in comparing performance of the students against one another. In addition, a test resolver should ideally work efficiently so as to maintain consistently high scoring rates. The test resolver should not have such a high scoring rate that the consistency or quality of scoring significantly declines; likewise, the test resolver should not have such a low scoring rate that the too few answer sheets are being scored. This manual scoring of test answer sheets, however, makes it difficult to monitor the consistency of scoring among the various test resolvers.

In many situations, test resolvers actually travel to a particular location so that all test resolvers may simultaneously score test answer sheets. Requiring the test resolvers to travel to a given location is inconvenient for the resolvers and expensive for those who administer the tests. Furthermore, tracking the performance of test resolvers against both their own performance and the performance of other resolvers can be very difficult with a manual scoring environment.

The process of resolving test questions is currently done manually, and this presents problems. A resolver is manually presented with the actual test answer sheets for scoring. This process is relatively inefficient, since the resolvers must score the answer sheets one at a time and in the order in which they are presented. Also, manual scoring systems do not have the capability to efficiently gather and categorize the test answers for subsequent analysis. Therefore, with a manual system it is very difficult to determine how teaching methods should be changed to decrease, for example, the number of incorrect answers.

A need thus exists for a system that promotes and achieves consistency and efficiency in scoring or resolving of tests.

SUMMARY OF THE INVENTION

The present multiple test item scoring system and method facilitates the speed at which answers to test questions are processed. The system and method efficiently organizes, groups, and displays the answers to the questions such that a test resolver can simultaneously view multiple answers. A plurality of answers for test questions are received. After receiving the test answers, the answers are organized into separate groupins, typically by resolution expertise of teh test resolver. Finally, the method and system displays through a test resolver a particular one of the groupins such that the test resolver can selectively view and score the answers to the test questions related to the resolver's resolution expertise.

DETAILED DESCRIPTION OF THE PREFERRED EMBODIMENT

In the following detailed description of the preferred embodiment, reference is made to the accompanying drawings which form a part hereof and in which is shown by way of illustration a specific embodiment in which the invention may be practiced. This embodiment is described in sufficient detail to enable those skilled in the art to practice the invention, and it is to be understood that other embodiments may be utilized and that structural or logical changes may be made without departing from the scope of the present invention. The following detailed description is, therefore, not to be taken in a limiting sense, and the scope of the present invention is defined by the appended claims.

HARDWARE CONFIGURATION

Figure 1:
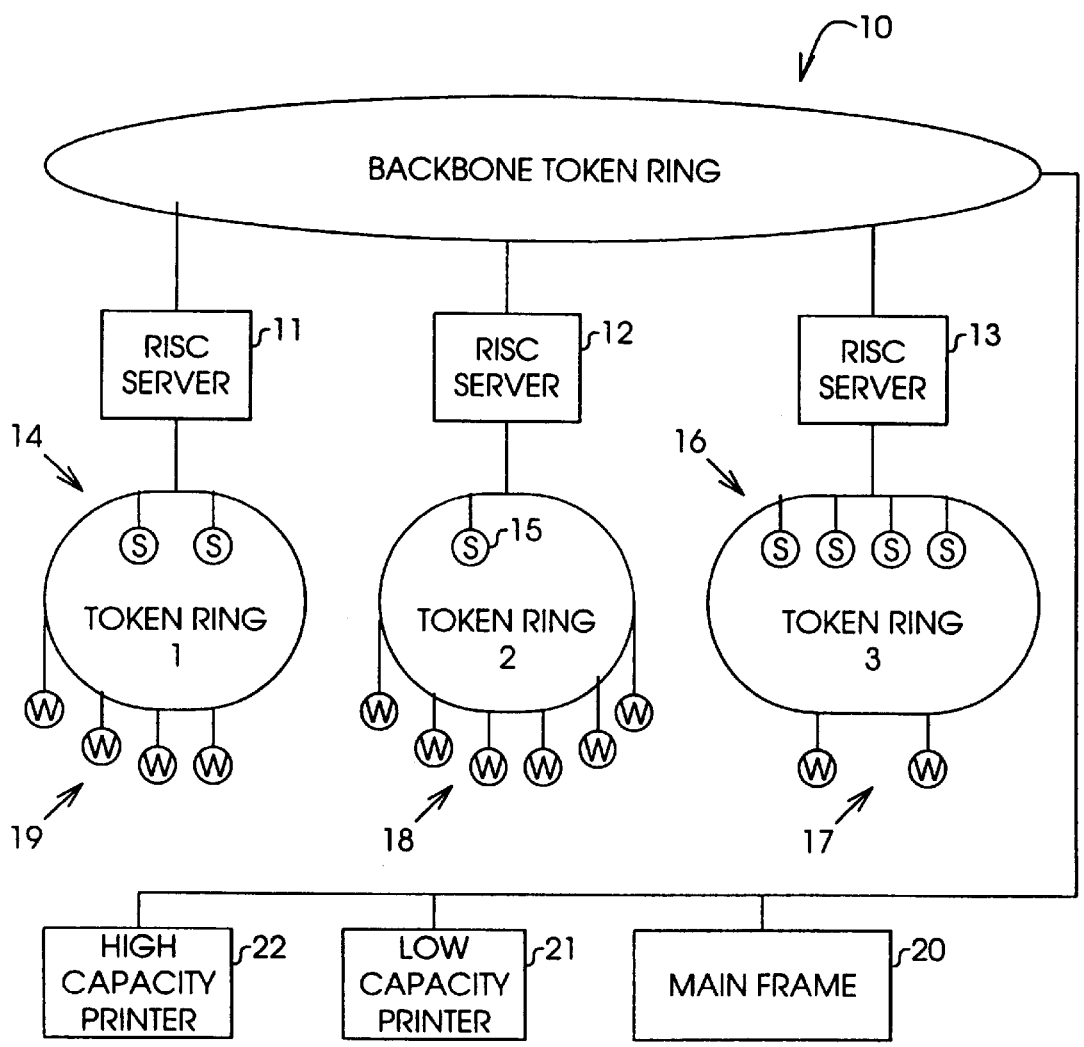
FIG. 1 is a diagram of a network that incorporates the present invention.

FIG. 1 illustrates an example of a hardware configuration for a network that incorporates the present invention. This configuration is shown as an example only; many different hardware configurations are available, as recognized by one skilled in the art, for implementing the software processing functions described below. The network shown comprises a mainframe computer 20 interfaced through a backbone token ring to a plurality of RISC servers 11, 12 and 13. Each RISC server is interfaced to a token ring that contains work stations and scanners. The RISC server 11 is connected in token ring 1 to scanners 14 and work stations 19. The RISC server 12 is connected in token ring 2 to scanner 15 and work stations 18. The RISC server 13 is connected in token ring 3 to scanners 16 and work stations 17. The mainframe computer 20 is also connected to a high capacity printer 22 and a low capacity printer 21 for printing reports of stored data within the system.

The system uses the scanners for reading in test answer sheets. These test answer sheets may comprise, for example, test forms with "bubbles" or ovals representing possible answers, handwritten essays, or other various types of written or printed information. After receiving the scanned test data, the system within the RISC servers can process those scanned test answer sheets to generate test items of interest from the answer sheets. A test item is, therefore, an electronic representation of at least a portion of a test answer sheet. The system may distribute these test items to the work stations for on-line scoring. A test scorer at a work station can then score the test item and enter a test score. The system receives the test scores via the network and the RISC servers and distributes the scores to an appropriate computer for subsequent printing and reporting; the appropriate computer may include, for example, the mainframe computer 20 or a server. The system may also transmit the test scores to, for example, a disk or telephone line.

Figure 2:
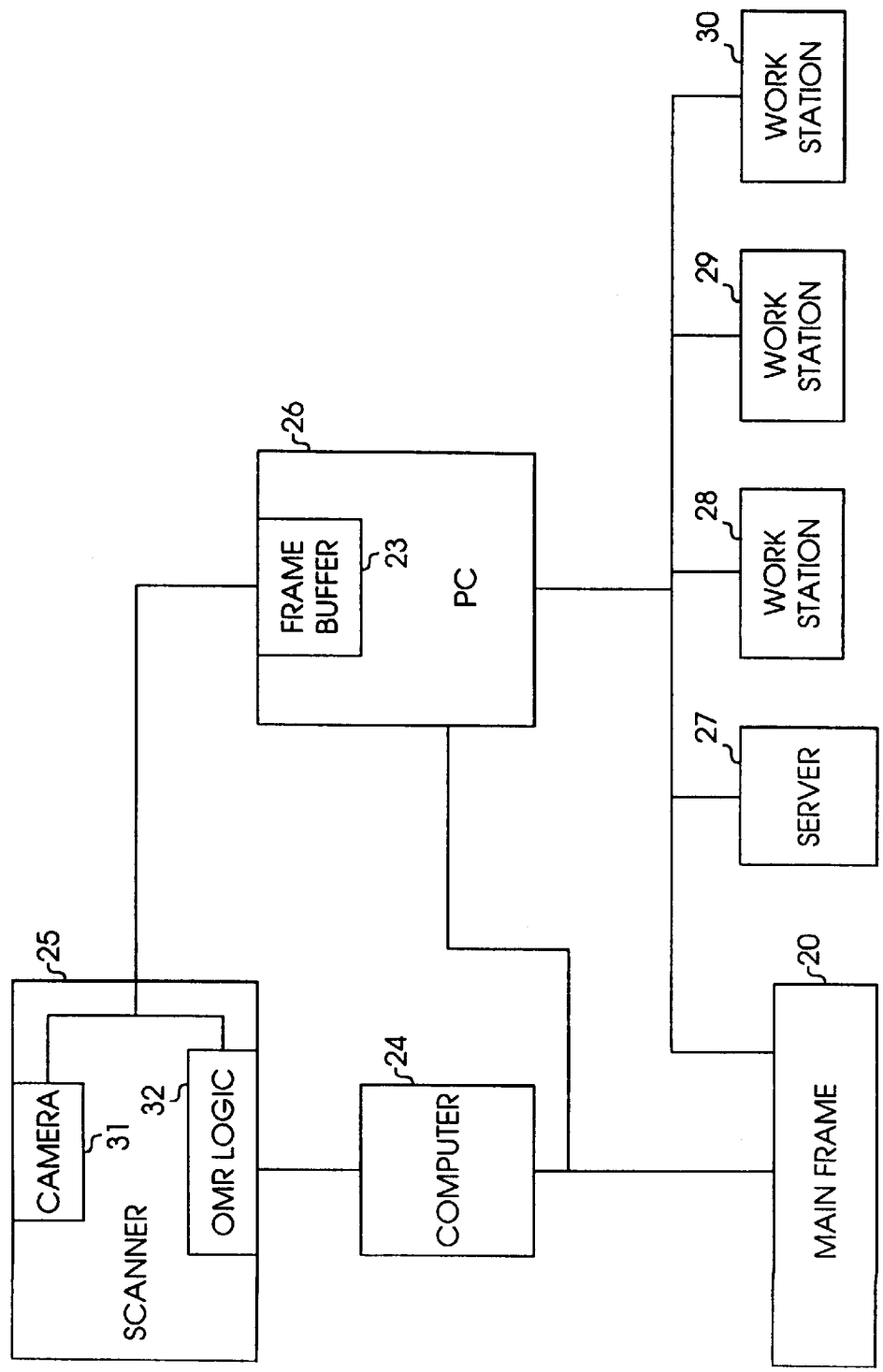
FIG. 2 is a block diagram of a portion of the network shown in FIG. 1.
Figure 3:
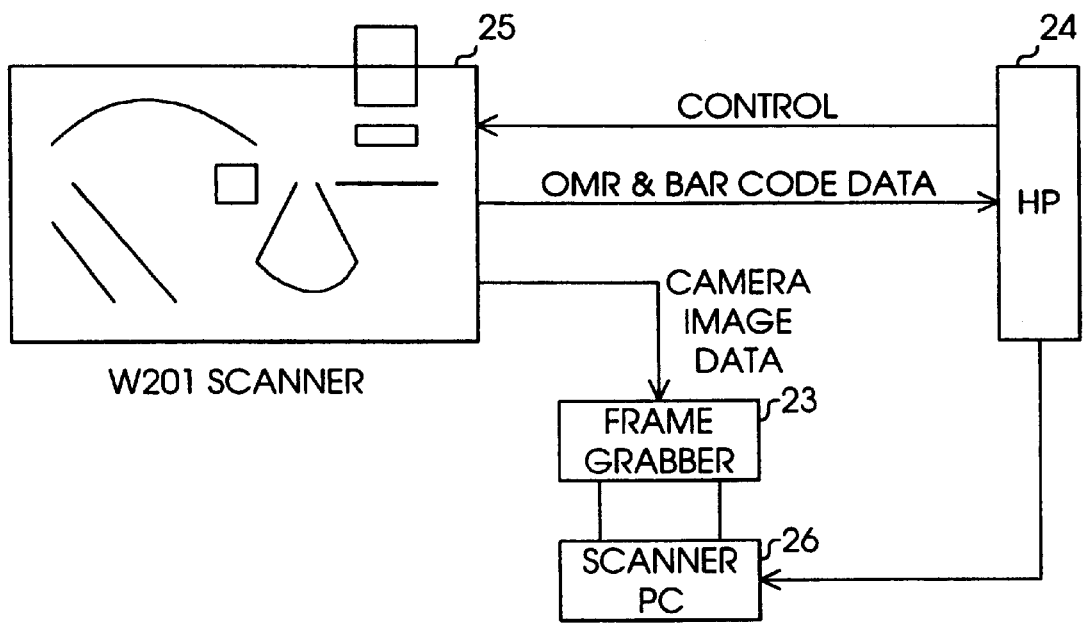
FIG. 3 is a block diagram of the scanning configuration in the network of FIG. 1.

FIG. 2 is a more detailed block diagram of a portion of the network shown in FIG. 1. As shown in FIG. 2, the scanning units shown in FIG. 1 typically comprise a scanner 25 interfaced to a computer 24 and personal computer (PC) 26. FIG. 3 shows a more detailed block diagram of a scanning unit. The scanner 25 contains a camera 31 for optically reading in a test answer sheet, and further contains optical mark recognition (OMR) logic 32 for processing the scanned data received from camera 31. The PC 26, preferably implemented with a high performance 486-level PC, contains a frame buffer 23 for receiving the scanned image data from the scanner 25.

The computer 24, preferably implemented with an HP 1000, is interfaced to the scanner 25 and PC 26 for controlling the operation of the scanning unit. The computer 24 is optional; the system may alternatively be configured such that all of the functionality of the computer 24 is within the PC 26. The computer 24 controls the scanner via the OMR logic 32 and thus controls when image data is scanned in and subsequently transferred to the PC 26. The PC 26 essentially acts as a buffer for holding the image data. The computer 24 further controls when the PC 26 will interrogate the image data for transmission to a server 27 for subsequent processing and scoring. The PC 26 can also electronically remove or "clip" an area of interest from the image data, which represents at least a portion of the scanned test answer sheets.

Examples of two systems for storing and extracting information from scanned images of test answer sheets are shown in U.S. Pat. Nos. 5,134,669 and 5,103,490, both of which are assigned to National Computer Systems, Inc. and are incorporated herein by reference as if fully set forth.

The server 27 receives the image data, which includes test items, and provides for processing and control of the image data. This portion, which may be a test item, is then distributed to the work stations 28, 29 and 30 for subsequent scoring. A test resolver (scorer) at the work station typically receives the test item, performs the scoring, and transmits the score to the receiving computer.

Figure 4:
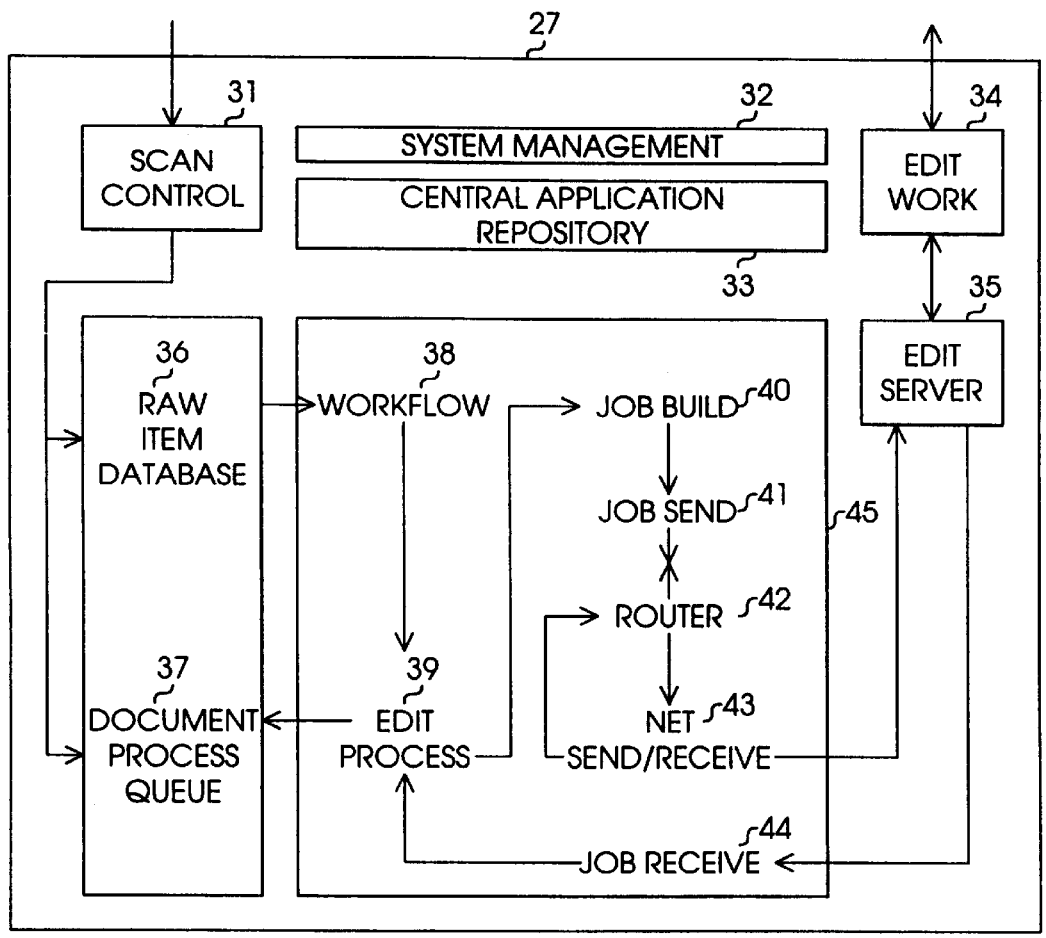
FIG. 4 is a block diagram of the server in the network of FIG. 1.

FIG. 4 is a block diagram of the hardware and software functions in a server in the network of FIG. 1. A scan control module 31 interfaces with the scanner PC 26 and receives the image data. The image data is stored in a raw item database 36. The central application repository (CAR) 33 typically stores document definitions and handling criteria. The document process queue 37 functions as a buffer into a main processing module 45 in server 27.

The main processing module 45 controls the processing of test items. It controls the transmission of test items to the work stations for scoring and the transmission of scores to the mainframe computer 20. The main processing module 45 also monitors the performance of the test resolvers to maintain consistent and efficient resolving of test items, as is explained below.

The main processing module 45 typically contains the following basic functions, which are controlled by system management module 32. A work flow module 38 receives image data from the database 36 and controls the flow of data into an edit process module 39. The edit process module 39 may perform machine scoring of the test items. For those test items which cannot be machine scored, or possibly for other test items, the system transmits such test items to the job build function 40. The job build function 40 determines what type of subsequent scoring is required for the test item and, for example, which work station will receive the test item. A job send module 41 receives the test item and transmits it to a router 42, which in turn transmits the test item to a send/receive communication module 43. Edit work module 34 and edit server module 35 control the flow of test items into and out of server 27. Incoming data, such as test answers from the work station, are transmitted through modules 34 and 35 to a job receive module 44. The job receive module transmits the data to the edit process module 39 for subsequent storage within the database 36.

SOFTWARE PROCESSING

Figure 5:
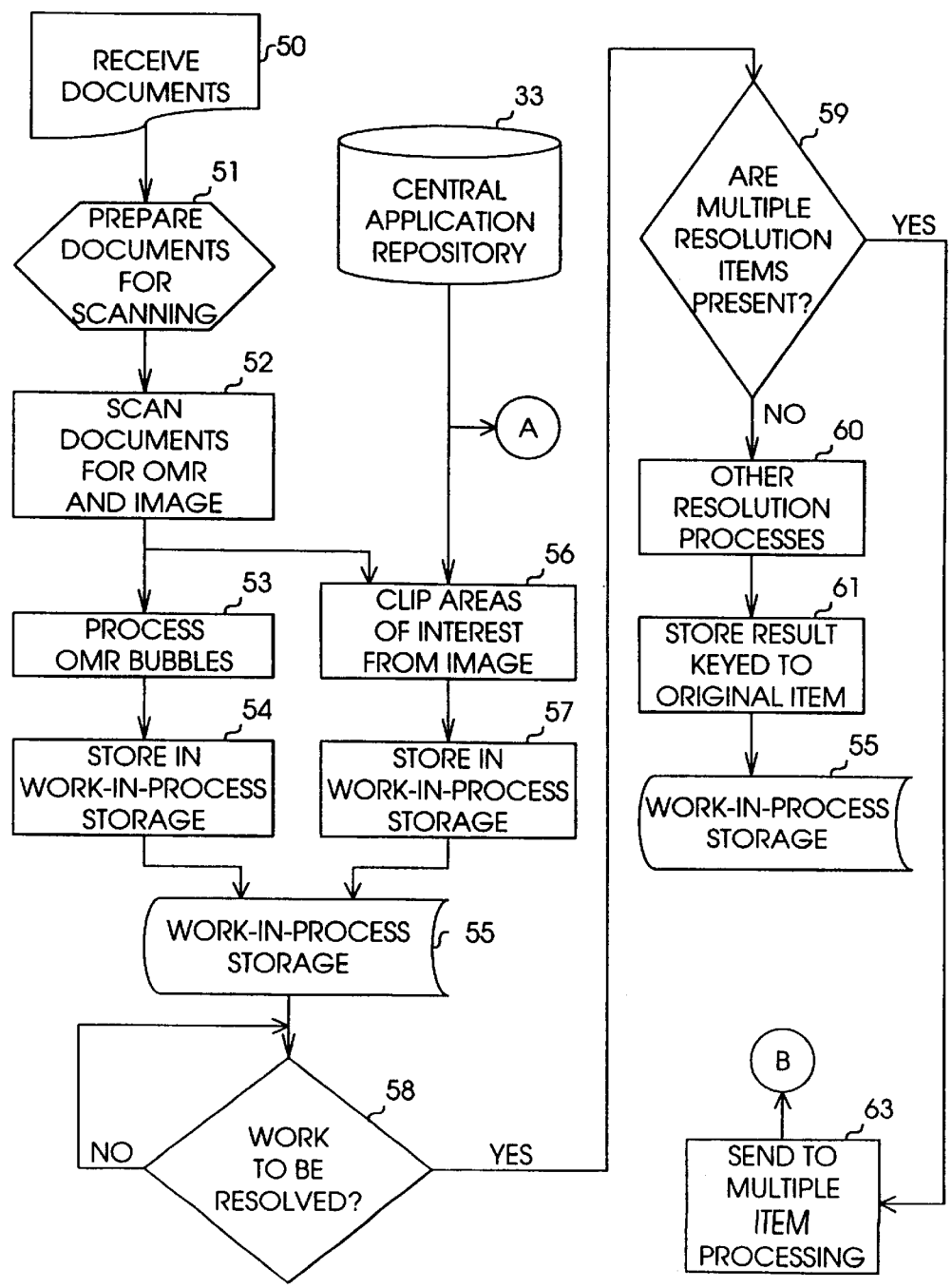
FIG. 5 is a flow chart of receiving and processing of test items.

FIG. 5 is a flow chart of typical scanning and processing of test and answer sheets. The document processing system receives the test answer sheets, or other documents, at step 50 and performs initial clerical preparation of the documents (step 51) for scanning at step 52. The system at step 52 scans the documents for OMR and other image data. The system may then process the OMR bubbles at step 53 and store the data in the work-in-process storage (WIP) at step 54. The system at step 56 can "clip" areas of interest from the scanned image. The step of "clipping" involves electronically removing, typically in software, a portion of the test item or scanned image. These "clipped" areas may comprise any portion of a test answer sheet; for example, a handwritten essay or selected response positions. The system may also receive image data directly from foreign sources, magnetic or electronic, and store the data in raw item database 36. Subsequent operations on the data are the same regardless as to the source of the data. After "clipping" areas of interest from the image, the system stores the test items at step 57 in the work-in-process storage 55.

The system waits at step 55 until it determines that a test item is ready to be resolved or scored. If multiple resolution items are present within the image data, as determined at step 59, then the system sends the test item to multiple item processing at step 63. Otherwise, the system performs other resolution processes on the data at step 60 and stores the result in work-in-process storage 55 at step 61. Other resolution processes may include, for example, machine scoring, raw key entry, and analytic resolving.

Analytic resolving or scoring may include, for example, map comparisons such as bit-mapped comparisons between two test items. The map comparisons allow a test resolver to compare, for example, the answers of a respondent over time to track the respondent's progress. For example, the analytic scoring may involve comparing two hand-drawn circles by the respondent to determine if the respondent's accuracy in drawing circles has improved over time. Analytic scoring may also include, for example, circling or electronically indicating misspelled words and punctuation errors in an answer such as an essay.

Multiple Item Scoring

Figure 6:
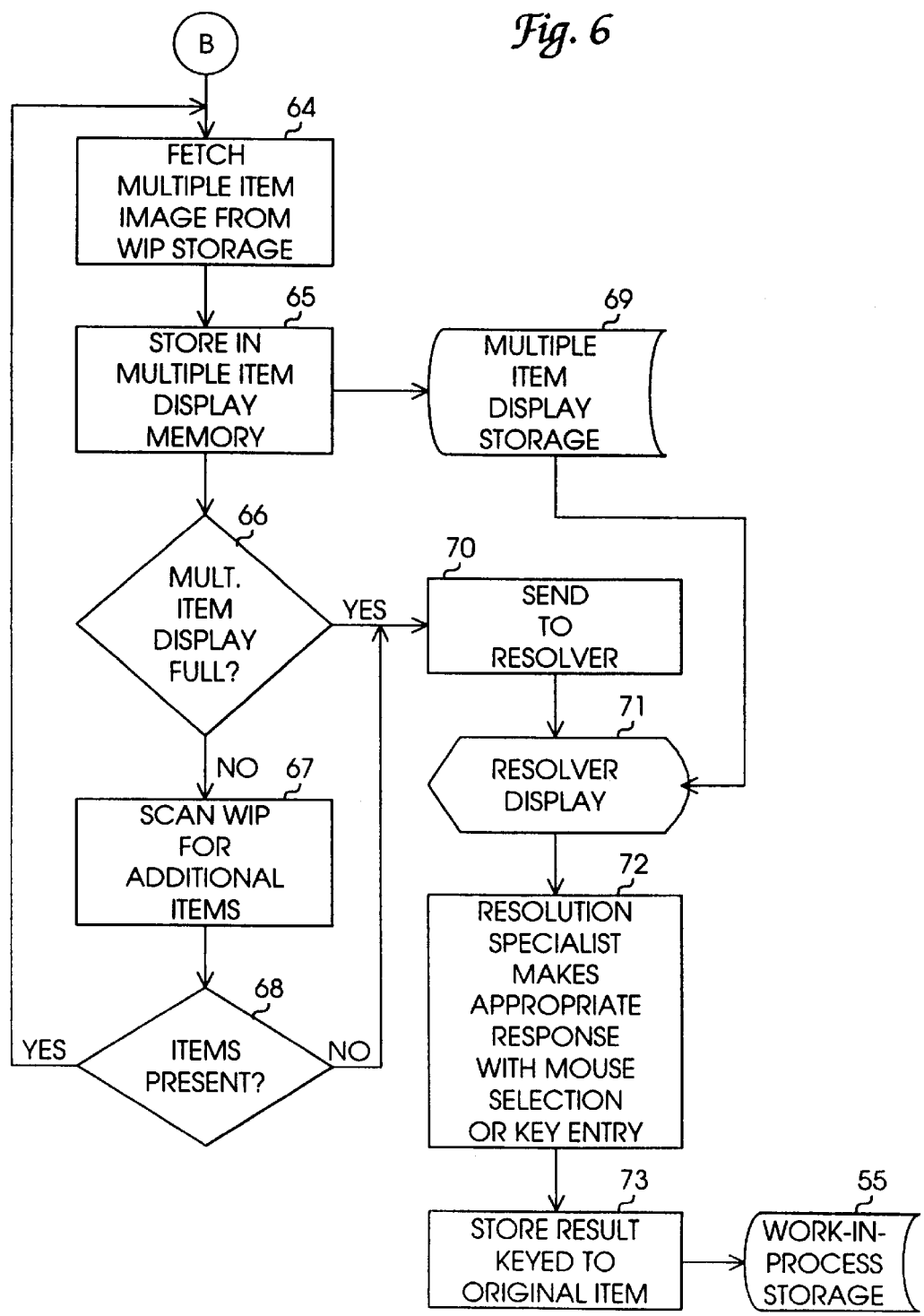
FIG. 6 is a flow chart of multiple item scoring.

FIG. 6 is a flow chart of typical multiple item processing. The system at step 64 typically first fetches a multiple item image from the work-in-process storage. The image is stored in a multiple item display memory 65 and a multiple item display storage 69 for subsequent display to a resolver. The system continues to receive multiple items until either the item display is full, as determined at step 66, or no more multiple items are present as determined at step 68. As long as the display is not full and additional multiple items are present, the system preferably scans the work-in-process storage at step 67 for additional items. When the multiple item display is full or no more multiple items are present, the system sends the compiled multiple items to a resolver at step 70 and displays the multiple test items on the resolver display 71.

The system typically transmits test items to a particular resolver based upon the resolver's resolution expertise. For example, a certain resolver may be assigned to score all of the test items relating to science questions. Resolution expertise may also comprise, for example, math, english, history, geography, foreign languages, or other subjects.

Figure 14:
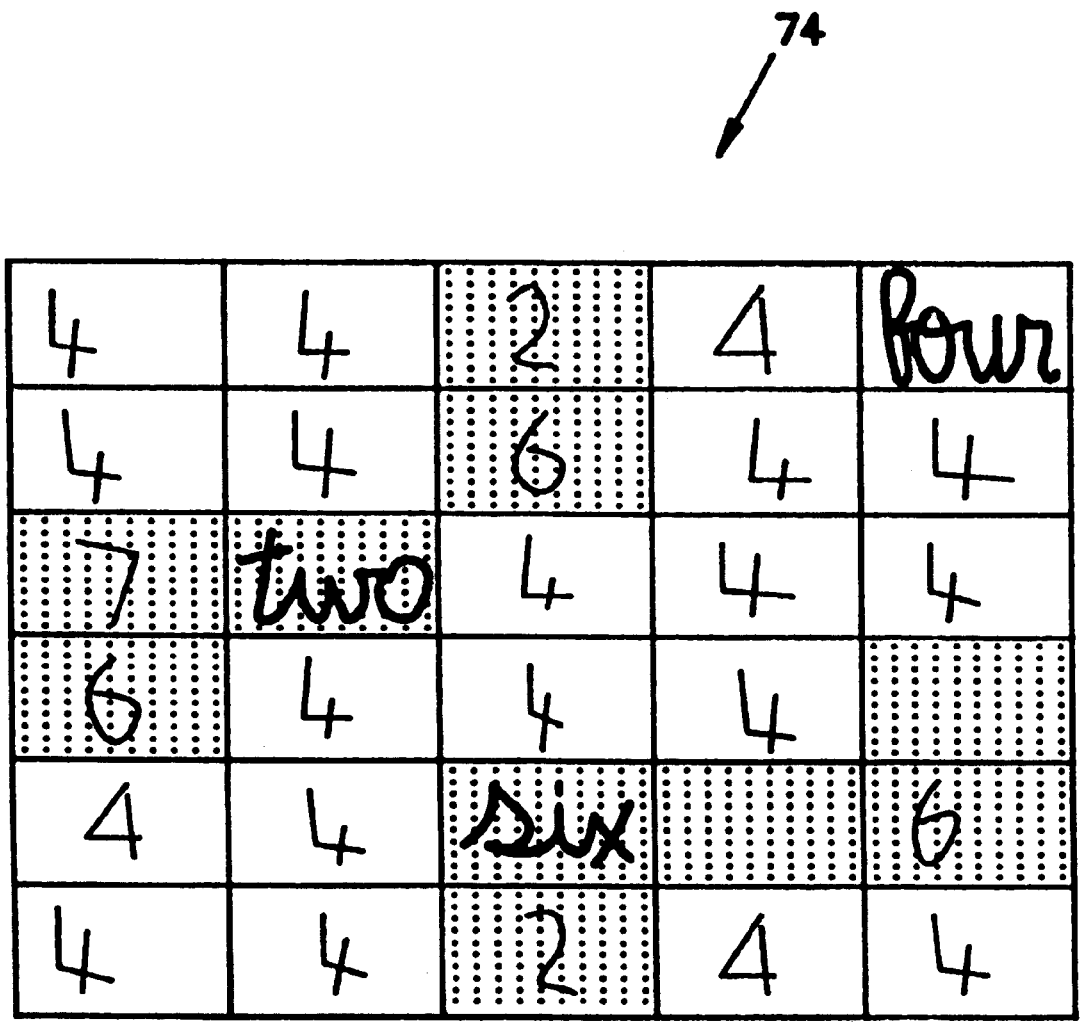
FIG. 14 is an example of a user interface for use with multiple item scoring.

An example of an interface on the resolver display is shown in FIG. 14. The interface typically comprises a plurality of cells 74, with each cell containing one test item to be resolved. After displaying the multiple items in the cells of the resolver display, the system allows the resolver at step 72 to score the multiple items. A test resolver would typically indicate the score of the answers by using a "mouse," light pen, touch screen, voice input, or some other type of cursor control or input device.

In the example shown in FIG. 14, the correct answer is "four" and the incorrect answers are indicated by the shading. Alternatively, a resolver could indicate the correct answers. The advantage of the multiple item system arises from the simultaneous display of test items in the cells 74, which allows a test resolver to quickly score many test items and thus achieve a faster response time in comparison to the display and scoring of only a single test item at a time. Even the simultaneous display of two items increases response time. As the matrix of cells increases, the simultaneous display of test items achieves a significant increase in response time and resolver attention and focus.

After scoring or resolving, the system receives the results at step 73 for subsequent storage in work-in-process storage 55. A test resolver typically transmits the results of resolving all displayed test items in the cells as a single unit for batch processing.

Categorized Item Reporting

Figure 7:
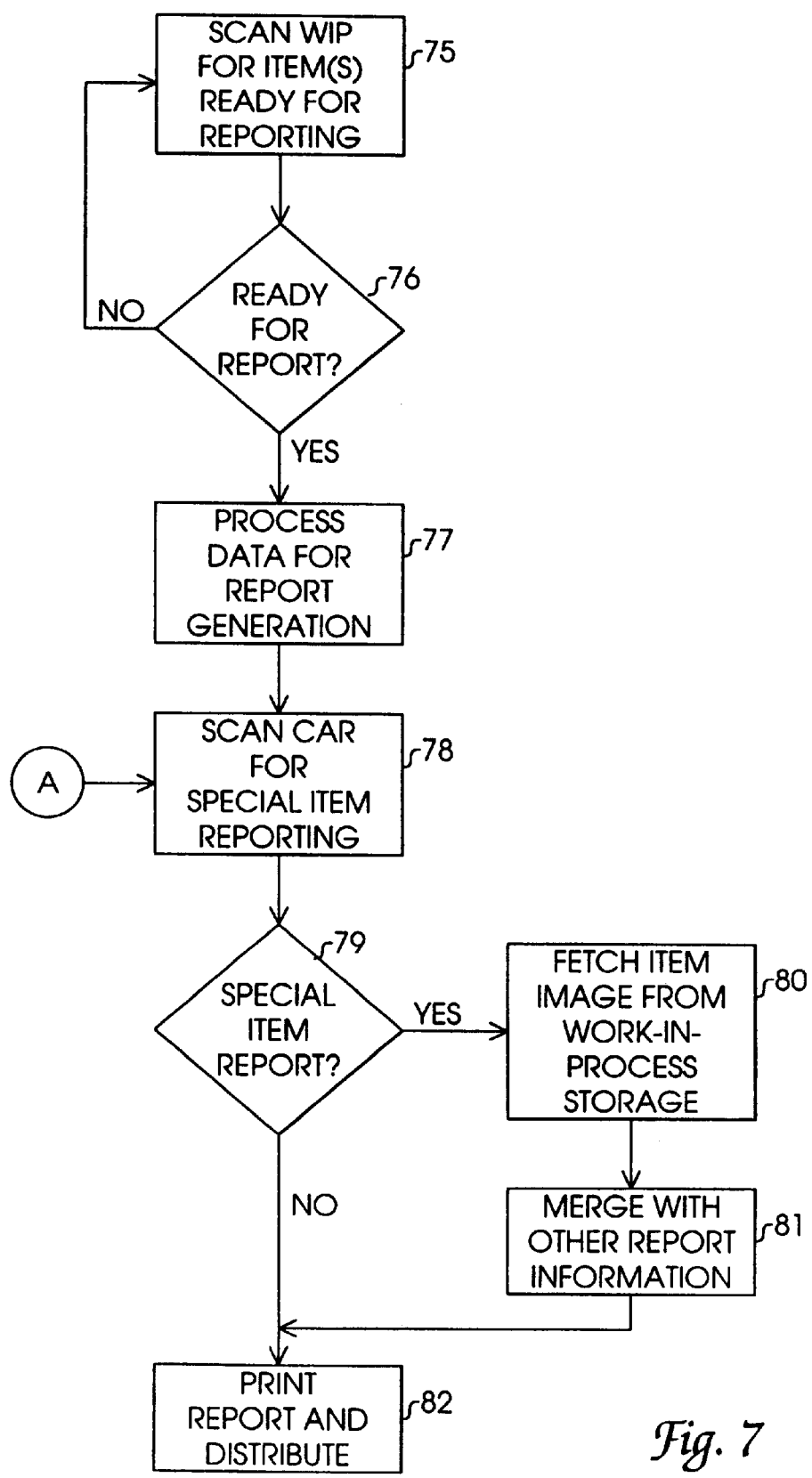
FIG. 7 is a flow chart of categorized (special) item reporting.
Figure 8:
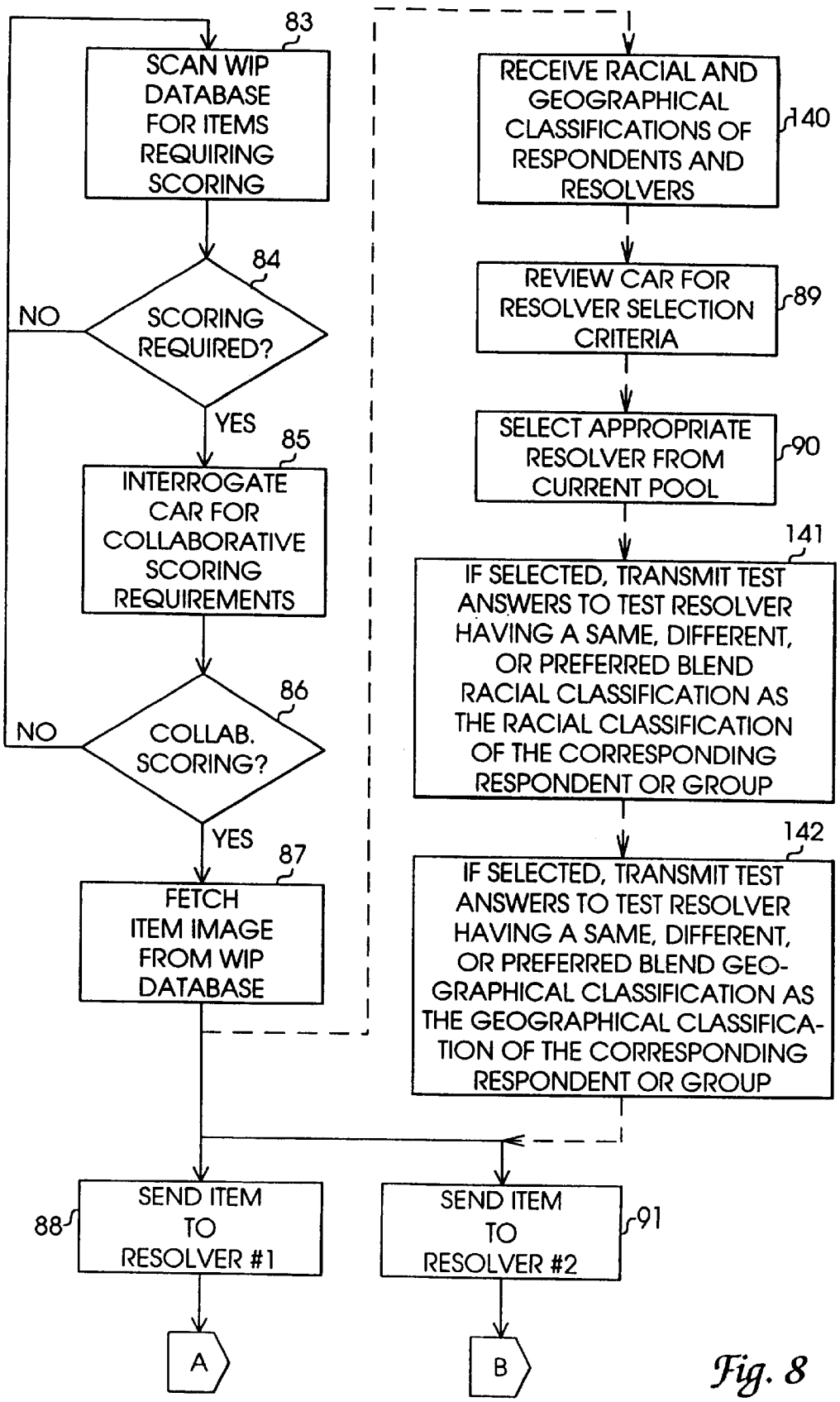
FIGS. 8–10 are a flow chart of collaborative scoring.

FIG. 7 is a typical flow chart of categorized (special) item reporting. Categorized item reporting allows the system to both group answers according to predefined categories and monitor processes used by the students or test-takers in arriving at a given answer. The categories in which test answers may be grouped include, for example, incorrect answers and correct answers within a curriculum unit within an instructional grouping and requested time frames; for example, all of the incorrect math answers in a particular instructor's class during the previous school year. Other groupings are possible depending upon the needs of the test resolvers and instructors who teach the material to which the test relates.

In addition, the system may merge an image of a test item with the corresponding score. In order to facilitate teaching of material to which the test relates, the system typically merges a test item representing an incorrect answer with the corresponding score. By reporting the actual test item, an instructor may gain insight into a thought process used by the student in arriving at the incorrect answer. Therefore, by having some knowledge of why a student answered a test question incorrectly, an instructor can take measures to change or modify teaching strategies to correct the situation.

The categorized item reporting normally comprises the following functions. The system at step 75 scans the work-in-process storage for items that are ready to be reported. If test items are ready for reporting, as determined at step 76, the system processes the data at step 77 for generating an appropriate report of the data. At step 78, the system scans the central application repository for definitions of categorized (special) items. As special items are available for reporting, as determined at step 79, the system retrieves the special items at step 80 and can merge it at step 81 with other report information, such as the corresponding test items, as explained above. The system then distributes a report at step 82, which can be a printed report.

Collaborative Scoring

FIGS. 8–11 are a flow chart of a typical collaborative scoring system. The collaborative scoring system provides for functions to achieve fairness and objectivity in resolving of test items. The collaborative scoring, for example, allows two resolvers to score the same item and, if the answers are not within a certain predefined range, provides for subsequent processing to resolve the discrepancy.

The system at steps 83 and 84 determines if items are available for scoring. At step 85, the system receives collaborative scoring requirements from the database and determines at step 86 if collaborative scoring is required. Examples of collaborative scoring requirements are illustrated below. If collaborative scoring has been specified, the system retrieves the item to be scored from the work-in-process database at step 87 and sends the item to resolvers 1 and 2 at steps 88 and 91.

The system is further able to choose resolvers according to selection criteria at steps 89 and 90. The selection criteria of the resolvers for scoring answers may include, for example, race, gender, or geographic location. The ability of the system to assign test resolvers to score particular test items provides the basis for increased fairness and consistency in the scoring of tests. For example, the system may assign test resolvers to test items based on the same racial classification, meaning that the test resolver has the same racial classification as the student or respondent whose test the resolver is scoring. The system may also assign test resolvers to test items based on a different, forced different, or preferred blend of classifications. The system monitors consistency in scoring based on the selection criteria and, more importantly, can change the selection criteria to ensure consistent and fair scoring of test items.

At step 140, the system receives racial classifications identifying a race of each of the respondents and the test resolvers, and received geographical classifications identifying a location where the tests were taken by the respondent and where the test answers are to be stored by the test resolvers. At step 89, the system reviews the CAR for resolver selection criteria. At step 90, the system selects an appropriate resolver from the current pool, which may involve: if selected, electronically transmitting each of the test answers to a test resolver terminal for a test resolver having a same, different, or preferred blend racial classification as the racial classification of the corresponding respondent or group of respondents (step 141); or, if selected, electronically transmitting each of the answers to a test resolver terminal for a test resolver having a same, different, or preferred blend geographical classification as the geographical classification of the corresponding respondent or group of respondents (step 142).

Figure 9:
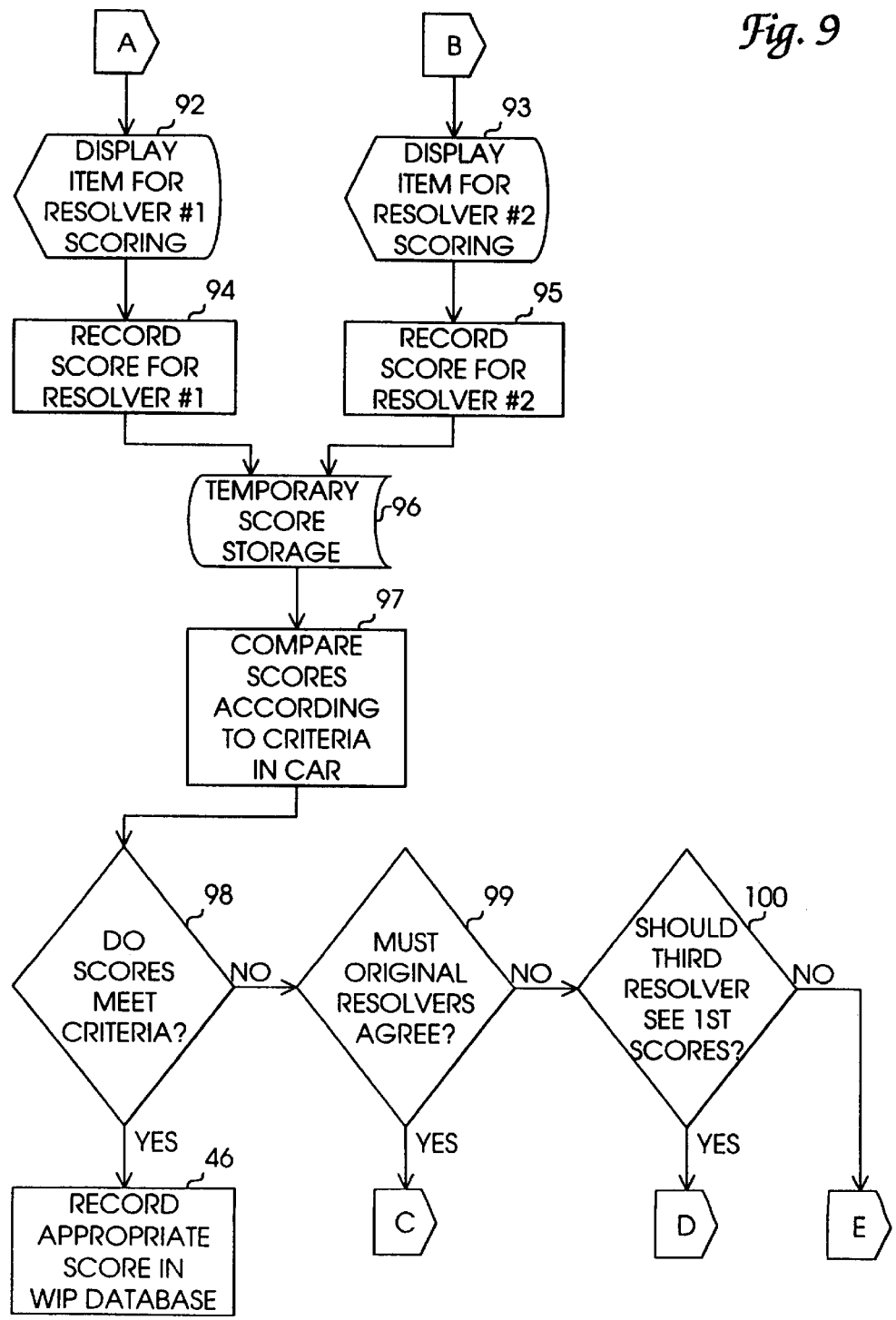

FIG. 9 is a flow chart showing additional typical functions of the collaborative scoring. At steps 92 and 93, the system displays the items to resolvers 1 and 2 for scoring. The system may further track the average scores of resolvers and not send the same test item to two resolvers who have provided average scores within a predefined range. This also helps to achieve consistency in scoring. For example, if two scorers each have provided high average scores in the past, as determined by the system, these two scorers should preferably not be collaboratively scoring the same test items, since it could result in "inflated" scores for particular test items.

The system records the scores from resolvers 1 and 2 at steps 94 and 95, respectively, and stores such scores in a temporary storage 96. At step 97, the system compares the scores according to criteria specified in the central application repository. Such criteria may include, for example, requiring that the scores be within a predefined percentage of each other. If the scores meet the criteria as determined at step 98, the system records the score in the work-in-process database at step 46. Otherwise, if the scores do not meet the criteria, the system determines at step 99 if the scores of the resolvers must agree. If the first two resolvers scores do not need to agree, then the system preferably transmits the test item to a third resolver to "cure" the discrepancy in the first two scores. At step 100, the system determines if the third resolver should see the first scores.

Figure 10:
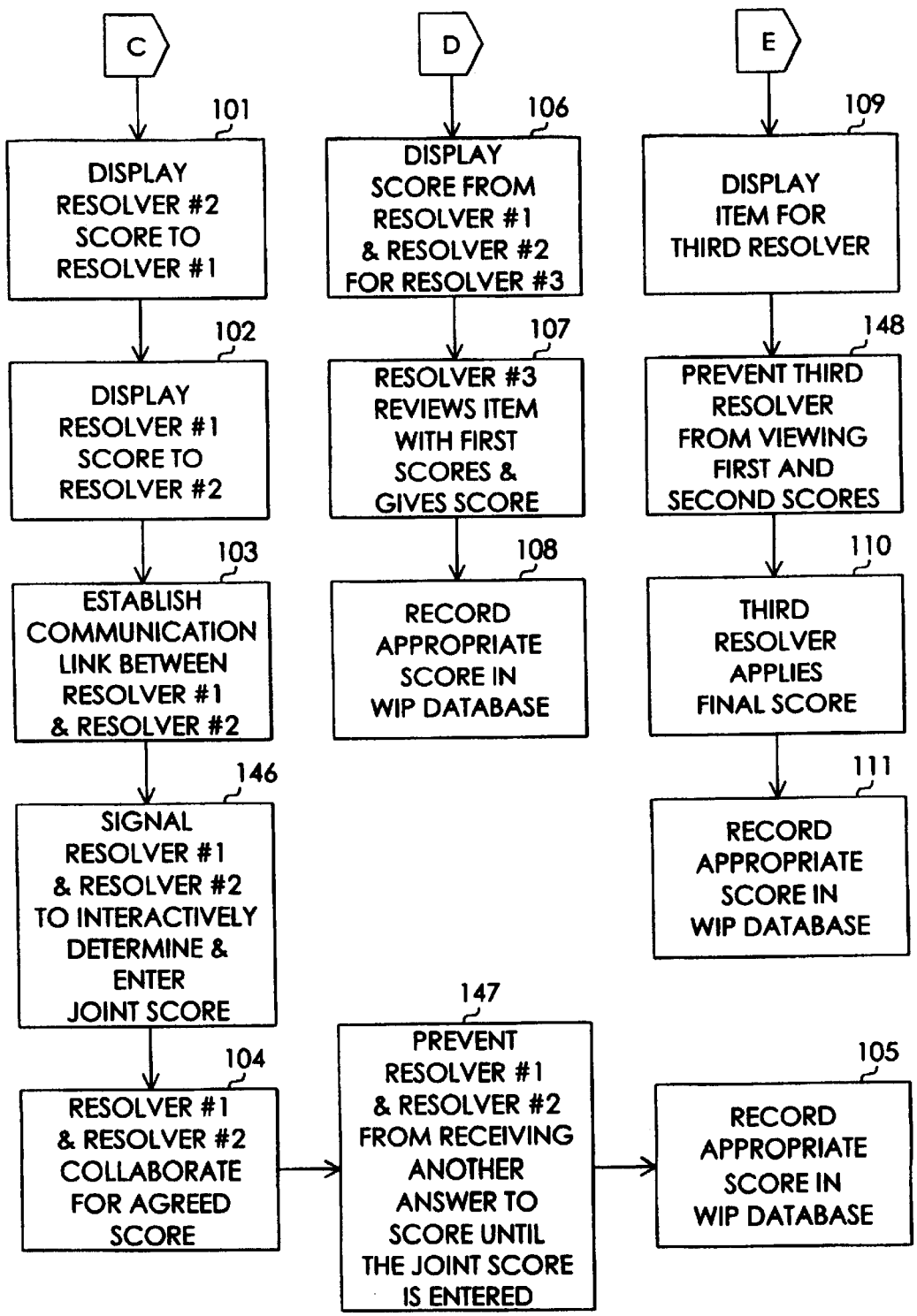

FIG. 10 shows additional typical processing of the collaborative scoring. If the original resolvers 1 and 2 must agree on a score, then the system executes steps 101–105. The system then typically first displays to each resolver the other resolver's score at steps 101 and 102 so that each resolver can see the score determined by the other resolver. At step 103, the system establishes a communication between the two resolvers. Such a communication link may be, for example, an electronic mail link so that the scorers can exchange information regarding the reasoning behind the score provided. At step 104, the resolvers work together to determine a single agreed-upon score for the test item. The system may prevent the resolvers 1 and 2 from receiving another test item until they have entered an agreed-upon score for the previous test item. Finally, at step 105, the system stores the agreed-upon score in the work-in-process database.

Instead of allowing the resolvers to work together to record an agreed-upon score, the system may optionally record either a greater value of the first and second test scores, a lower value of the first and second test scores, or an average value of the first and second test scores.

If the collaborative scoring criteria specifies that the third resolver should arbitrate the discrepancy and determine a score, then the system displays scores from the resolvers 1 and 2 at step 106 for resolver 3. The third resolver (resolver 3) then typically enters a score for the test item at step 107, and the system records the score in the work-in-process database at step 108.

If the collaborative scoring requirement specifies that the third resolver should not see the first two scores, then the system executes steps 109–111. At step 109, the system displays the test item for the third resolver. The third resolver then typically enters a score at step 110, and the system records the score in the work-in-process database at step 111.

Quality Items

Figure 11:
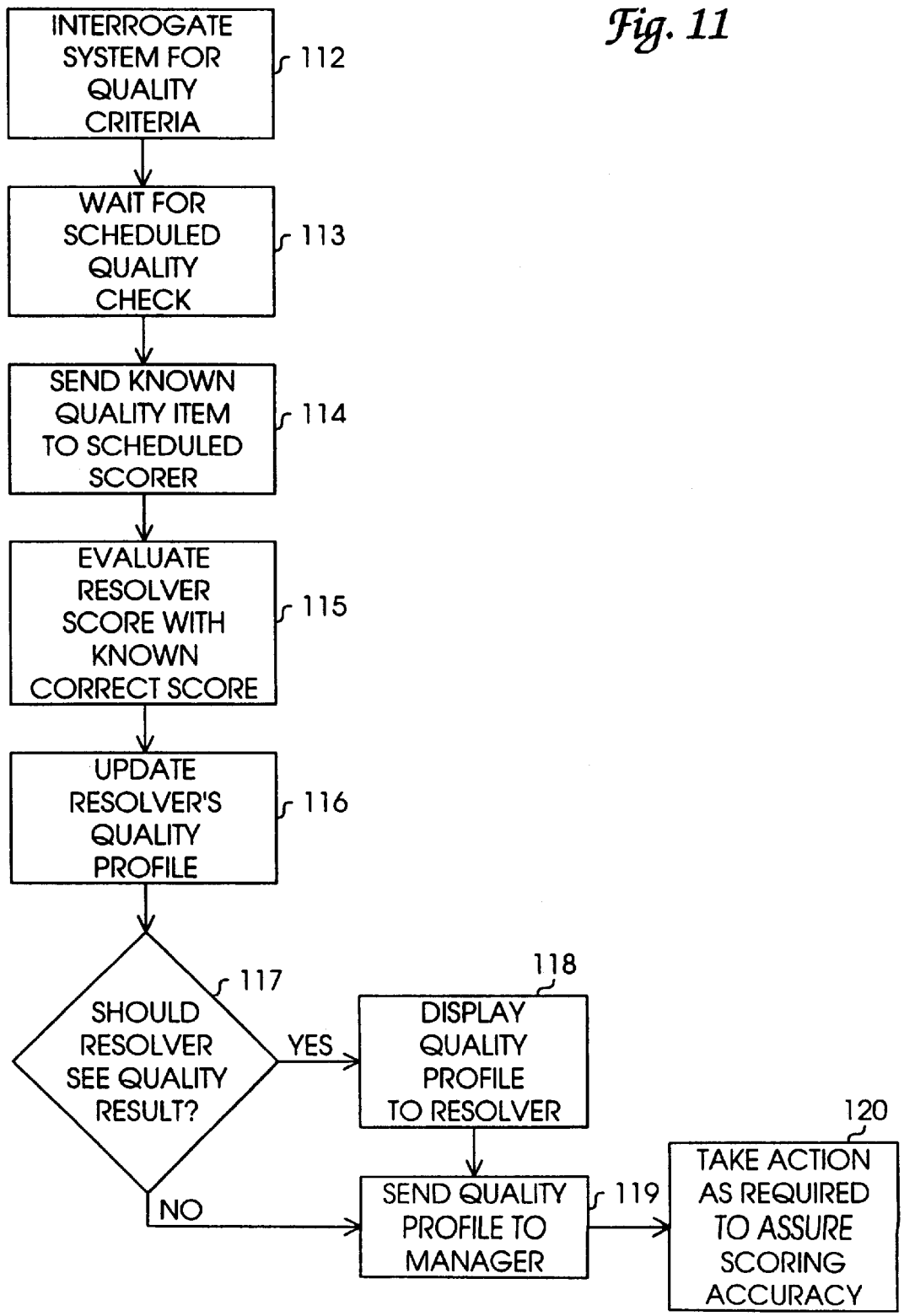
FIG. 11 is a flow chart of quality item processing.

FIG. 11 is a typical flow chart of the use of quality items in the scoring process. The system can use quality items to check and monitor the accuracy of the scoring for selected test resolvers in order to maintain consistent and high quality scoring of test items. At step 112, the system determines or receives the quality criteria. The quality criteria may be, for example, a predetermined test item with a known "correct" score.

The system then waits for a scheduled quality check at step 113. At the quality check, the system, at step 114, sends the known quality item to the scheduled resolver. At step 116, the system updates the resolver's quality profile based on the evaluation at step 115. If the resolver should receive a quality result, as determined at step 117, the system displays the quality profile to the resolver at step 118. At step 119, the system sends the quality profile to a manager for subsequent review. At step 120, the system takes action required to assure scoring accuracy.

Resolver Monitoring and Feedback

Figure 12:
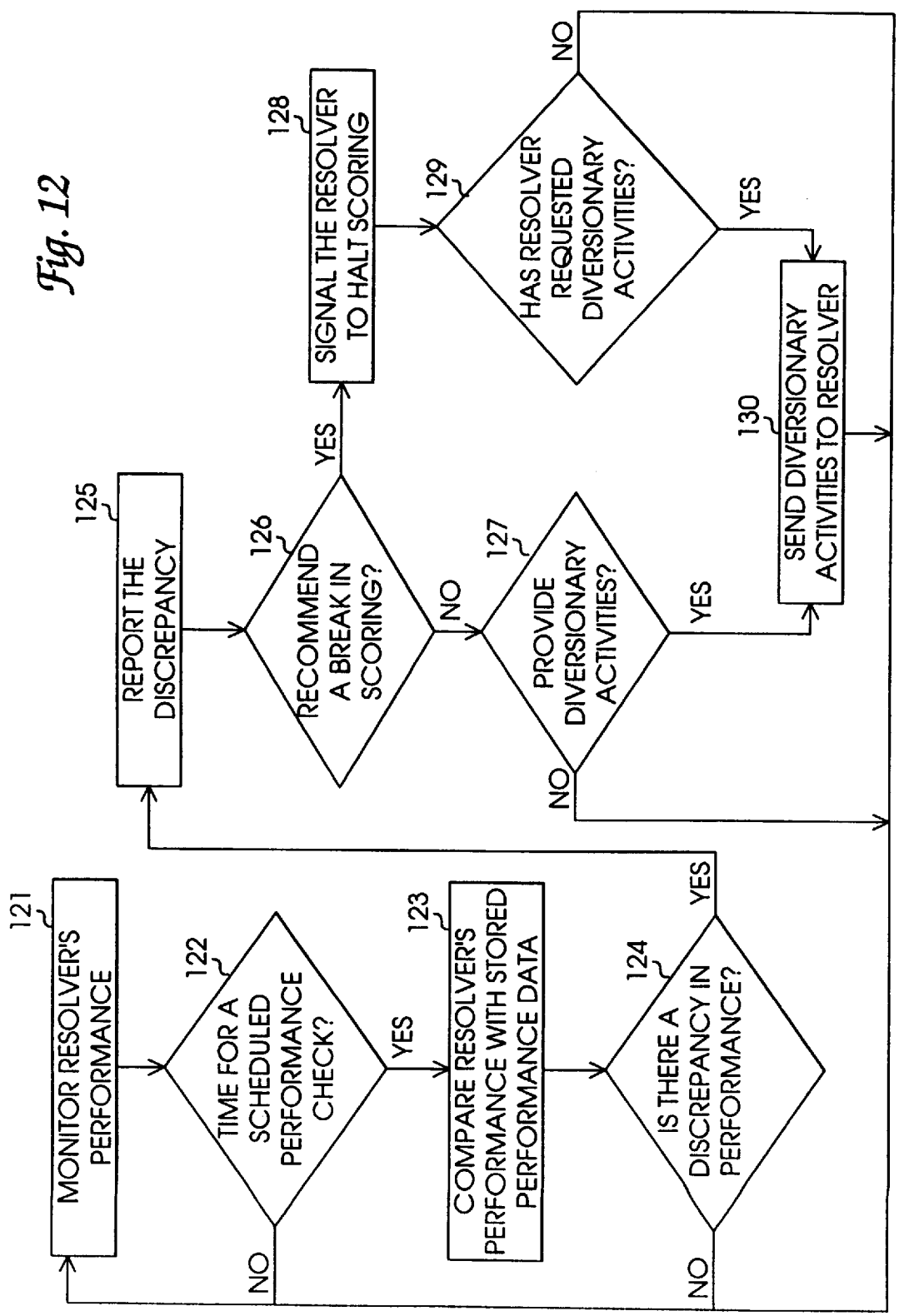
FIG. 12 is a flow chart of resolver monitoring and feedback.

FIG. 12 is a flow chart of typical resolver monitoring and feedback. The primary factors in monitoring performance typically include: (1) validity; (2) reliability; and (3) speed. In monitoring these factors, the system promotes repeatability of scoring. These factors may be monitored by tracking a resolver's performance against past performance of the resolver or against some known goal.

Validity is typically measured by determining if a particular resolver is applying the scoring key correctly to test items or, in other words, scoring test items as an expert would score the same items. Reliability is typically measured by determining if a particular will resolve the same test item the same way over time (providing consistent scoring). Speed is typically measured by comparing a resolver's scoring rate with past scoring rates of the resolver or other scoring rates, such as average scoring rates or benchmark scoring rates.

At step 121, the system typically continually monitors the resolver's performance and updates the performance. Monitoring the resolver's performance may include, as explained above, monitoring the resolver's validity, reliability, and speed in resolving test items. The system periodically, according to predefined criteria, performs performance checks of the test resolvers. Predefined criteria may include, for example: a time period; recalls (how often a resolver evaluates his or her own work); requesting help; the number of agreements among multiple resolvers; the amount of deviation between the resolver's score and a known score, which may be determined using quality items; the frequency of these deviations; the speed at which a resolver enters a response during resolving of test items; the length of time between scores entered by a test resolver; a test resolver's previous scoring rate, an average scoring rate of a test resolver; average scoring rates of other test resolvers; or some predetermined benchmark scoring rate.

At step 122, the system determines whether it is time for a scheduled performance check according to the predetermined criteria. If it is time for a performance check, the system at step 123 compares the resolvers' current performance, as determined at step 121, with the stored performance criteria. At step 124, the system determines if there is a discrepancy in the resolver's performance according to the predetermined criteria. For example, the system may determine if the resolver's current scoring rate is within a predefined percentage of the average scoring rate in order to ensure efficient scoring by the test resolver. If there is no discrepancy, the system returns to monitoring the resolver's performance. In addition, the system may store the resolver's current performance values for later processing. Otherwise, the system reports the discrepancy at step 125.

At step 126, the system determines if it should recommend a break in scoring to the resolver. If according to predetermined performance criteria, the system should recommend a break in scoring, then the system signals the resolver at step 128 to halt scoring. Predefined performance criteria may include, for example, deviations in the resolver's validity, reliability, or speed of resolving test items. Examples of predefined performance criteria are provided above with respect to the monitoring of resolvers' performance.

When the resolver stops scoring, the system may provide the resolver with the option of requesting diversionary activities. Diversionary activities are designed to provide the test resolver with a rest period and "break" from scoring to increase efficiency. Examples of diversionary activities include computer games and cross word puzzles. If the resolver has requested such diversionary activities, as determined at step 129, then the system transmits a diversionary activity to the resolver at step 130. Otherwise, the system returns to monitoring the resolver's scoring rate when the resolver resumes the scoring.

If the system at step 126 does not recommend a break in scoring based on the discrepancy, then the system may optionally provide the resolver with diversionary activities as determined at step 127. If the resolver should receive the diversionary activities, then the system sends such activities to the resolver at step 130. Otherwise the system returns to monitoring the resolver's scoring rate.

On-Line Scoring Guide

Figure 13:
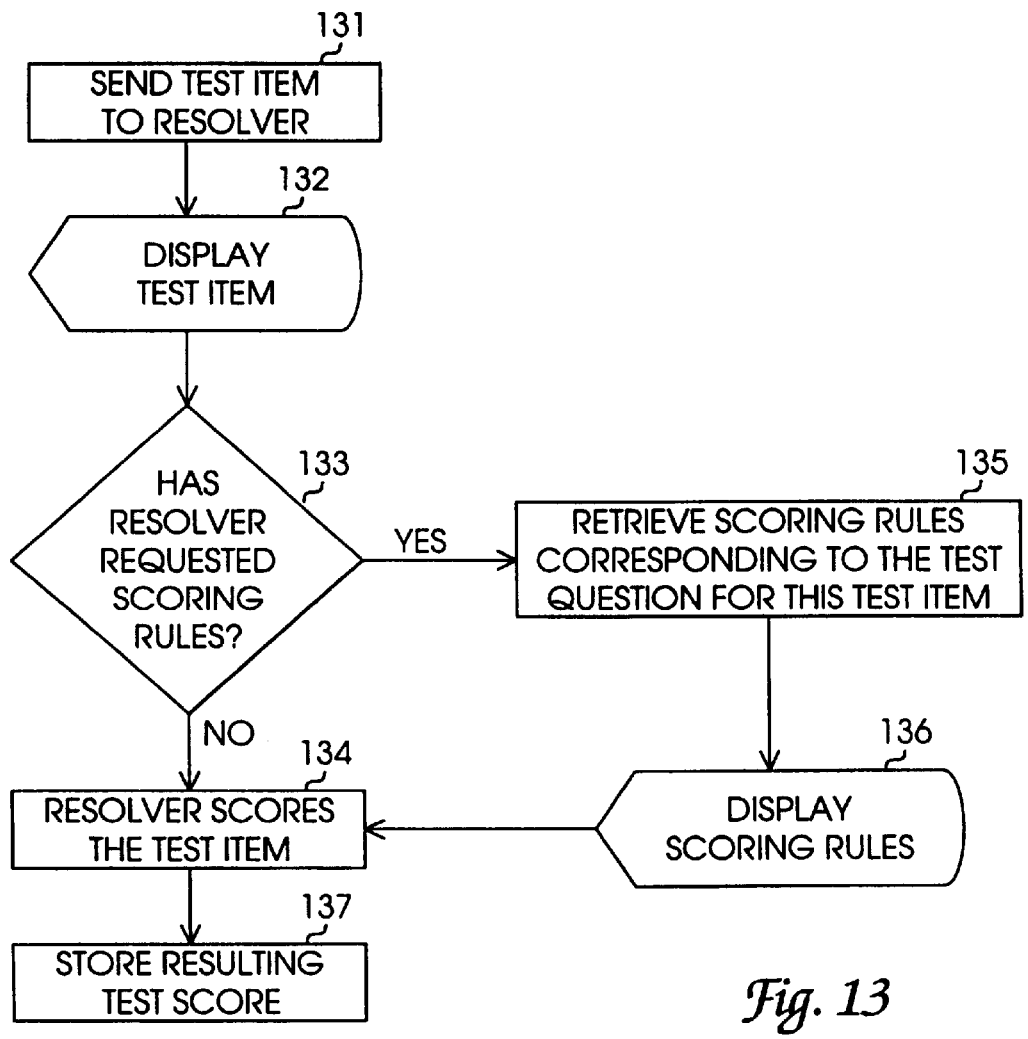
FIG. 13 is a flow chart of an on-line scoring guide system.

FIG. 13 is a flow chart of a typical on-line scoring guide system. The on-line scoring guide increases scoring efficiency by allowing the resolver to request scoring rules in order to assist in scoring a particular test item. In response to the request, the system displays scoring rules corresponding to a test question for the test item currently displayed to the resolver. A resolver may thus quickly have specific scoring rules available on-line while scoring test items. This promotes scoring efficiency and reduces unnecessary break times resulting from determining how to score a particular test item.

At step 131, the system sends a test item to a resolver for scoring and displays the test item at step 132. If the resolver has requested scoring rules, as determined at step 133, then the system interrogates a stored scoring guide to locate scoring rules that correspond to a test question for the test item currently displayed to the resolver. The system retrieves those particular scoring rules at step 135 and displays them to the resolver at step 136. The system preferably uses a multi-tasking environment in order to simultaneously display the scoring rules and the test item. At step 134, the system waits for the resolver to score the test item. At step 137, the system stores the test score entered by the resolver into the work-in-process storage.

As described above, the present invention is a system that processes test items. The various functions used in processing the test items promote efficient, high quality, and consistent scoring of test items.

While the present invention has been described in connection with the preferred embodiment thereof, it will be understood that many modifications will be readily apparent to those skilled in the art, and this application is intended to cover any adaptations or variations thereof. For example, a different hardware configuration may be used without departing from the scope of the invention and many variations of the processes described may be used. It is manifestly intended that this invention be limited only by the claims and equivalents thereof.

What is claimed is:

1. A system for increasing the speed at which answers to test items are processed by efficiently organizing, grouping, and displaying the answers to the questions such that a test resolver can selectively view multiple answers from a grouping related to the Resolver's expertise, the system comprising:

a) receive means for electronically receiving a plurality of answers for test questions;

b) organization means for electronically dividing the test questions by resolution expertise and for electronically organizing into separate groupings answers to questions related to resolution expertise; and c) display means for electronically presenting to a test resolver a particular one of the groupings such that the test resolver can selectively view and score the answers to the test questions related to the resolver's resolution expertise.

2. The system of claim 1 wherein the display means comprises means for allowing the test resolver to simultaneously view and score a plurality of answers related to the resolution expertise.

3. The system of claim 1 wherein the display means further comprises batch processing means for transmitting and presenting to the test resolver an entire set of one of the groupings such that the test resolver can selectively view and score the entire set.

4. The system of claim 1 wherein the display means further comprises cell means for electronically and simultaneously presenting to the test resolver a plurality of cells with each of the cells containing an answer to a particular one of the test questions from a particular one of the groupings.

5. The system of claim 4 wherein the cell means further comprises selection means for allowing the test resolver to select particular ones of the cells to score the individually displayed answers.

6. A method for increasing the speed at which answers to test items are processed by efficiently organizing, grouping, and displaying the answers to the questions such that a test resolver can selectively view multiple answers from a grouping related to the resolver's expertise, the method comprising the steps of:

a) electronically receiving a plurality of answers for test questions;

b) electronically dividing the test questions by resolution expertise and for electronically organizing into separate groupings answers to questions related to resolution expertise; and c) electronically presenting to a test resolver a particular one of the groupings such that the test resolver can selectively view and score the answers to the test questions related to the resolver's resolution expertise.

7. The method of claim 6 further comprising the step of the test resolver simultaneously viewing and scoring a plurality of answers related to the resolution expertise.

8. The method of claim 6 further comprising the step of transmitting and presenting to the test resolver in a batch mode an entire set of one of the groupings such that the test resolver can selectively view and score the entire set.

9. The method of claim 6 further comprising the step of electronically and simultaneously presenting to the test resolver a plurality of cells with each of the cells containing an answer to a particular one of the test questions from a particular one of the groupings.

10. The method of claim 9 further comprising the step of the test resolver selecting particular ones of the cells to score the individually displayed answers.

11. A system for increasing the speed at which answers to test items are processed by efficiently organizing, grouping, and displaying the answers to the questions such that a test resolver can selectively view multiple answers from a grouping related to the resolver's expertise, the system comprising:

a) a receiving subsystem configured to electronically receive a plurality of answers for test questions;

b) a dividing subsystem configured to electronically divide the test questions by resolution expertise and to electronically organize into separate groupings answers to questions related to resolution expertise; and c) a presentation subsystem configured to electronically present to a test resolver a particular one of the groupings such that the test resolver can selectively view and score the answers to the test questions related to the resolver's resolution expertise.

12. The system of claim 11 wherein the presentation subsystem is further configured to permit the test resolver to simultaneously view and to score a plurality of answers related to the resolution expertise.

13. The system of claim 11 wherein the receiving subsystem is further configured to transmit and present to the test resolver in a batch mode an entire set of one of the groupings such that the test resolver can selectively view and score the entire set.

14. The system of claim 11 wherein the presentation subsystem is further configured to electronically and simultaneously present to the test resolver a plurality of cells with each of the cells containing an answer to a particular one of the test questions from a particular one of the groupings.

15. The system of claim 11 wherein the presentation subsystem is further configured to permit the test resolver to select particular ones of the cells to score the individually displayed answers.

16. A computer-readable program storage medium tangibly embodying a data package and associated verification instructions executable by a computing system for efficiently organizing, grouping, and displaying the answers to the questions such that a test resolver can selectively view multiple answers from a grouping related to the resolver's expertise to perform the steps of:

a) electronically receiving a plurality of answers for test questions;

b) electronically dividing the test questions by resolution expertise and for electronically organizing into separate groupings answers to questions related to resolution expertise; and c) electronically presenting to a test resolver a particular one of the groupings such that the test resolver can selectively view and score the answers to the test questions related to the resolver's resolution expertise.

17. The computer-readable program storage medium of claim 16 further comprising the step of the test resolver simultaneously viewing and scoring a plurality of answers related to the resolution expertise.

18. The computer-readable program storage medium of claim 16 further comprising the step of transmitting and presenting to the test resolver in a batch mode an entire set of one of the groupings such that the test resolver can selectively view and score the entire set.

19. The computer-readable program storage medium of claim 16 further comprising the step of electronically and simultaneously presenting to the test resolver a plurality of cells with each of the cells containing an answer to a particular one of the test questions from a particular one of the groupings.

20. The computer-readable program storage medium of claim 19 further comprising the step of the test resolver selecting particular ones of the cells to score the individually displayed answers.

* * * * *